United States Patent
Kuroda

(10) Patent No.: US 9,669,812 B2
(45) Date of Patent: Jun. 6, 2017

(54) ELECTRIC POWER STEERING SYSTEM

(75) Inventor: Yoshihide Kuroda, Obu (JP)

(73) Assignee: DENSO CORPORATION, Kariya (JP)

( * ) Notice: Subject to any disclaimer, the term of this patent is extended or adjusted under 35 U.S.C. 154(b) by 181 days.

(21) Appl. No.: 13/604,885

(22) Filed: Sep. 6, 2012

(65) Prior Publication Data

US 2013/0079976 A1    Mar. 28, 2013

(30) Foreign Application Priority Data

Sep. 27, 2011  (JP) ................. 2011-210818

(51) Int. Cl.
*G01M 17/06* (2006.01)
*B60T 8/1755* (2006.01)
*B62D 5/04* (2006.01)

(52) U.S. Cl.
CPC .............. *B60T 8/1755* (2013.01); *B62D 5/04* (2013.01); *B62D 5/0487* (2013.01)

(58) Field of Classification Search
CPC ......... G01M 17/06; B60T 8/1755; B62D 5/04
USPC ....................................................... 701/34.4
See application file for complete search history.

(56) References Cited

U.S. PATENT DOCUMENTS

| | | | | | |
|---|---|---|---|---|---|
| 4,208,621 | A * | 6/1980 | Hipkins | .................... | H02P 6/06 318/400.21 |
| 5,509,369 | A * | 4/1996 | Ford | .................... | B63H 21/265 114/150 |
| 5,969,919 | A * | 10/1999 | Kobayashi | ........... | B62D 5/0484 318/281 |
| 6,271,637 | B1 * | 8/2001 | Kushion | ....................... | 318/434 |
| 6,448,738 | B1 * | 9/2002 | Burton | .................. | B62D 5/046 318/798 |
| 2001/0053952 | A1 * | 12/2001 | Kodaka et al. | ................. | 701/43 |
| 2006/0131096 | A1 * | 6/2006 | Ono et al. | ..................... | 180/400 |
| 2006/0271336 | A1 * | 11/2006 | Murphy | ............... | B62D 5/0487 702/183 |
| 2008/0147276 | A1 * | 6/2008 | Pattok et al. | .................. | 701/42 |
| 2008/0208410 | A1 * | 8/2008 | Katrak | .................. | B62D 5/008 701/42 |
| 2008/0243339 | A1 * | 10/2008 | Nishimori et al. | ............ | 701/41 |
| 2009/0183714 | A1 * | 7/2009 | Mayuzumi | .................... | 123/490 |
| 2009/0218967 | A1 * | 9/2009 | McLean et al. | ........... | 318/400.3 |
| 2010/0049403 | A1 * | 2/2010 | Gillman et al. | ................ | 701/43 |
| 2011/0022272 | A1 * | 1/2011 | Hung et al. | ..................... | 701/42 |
| 2011/0156626 | A1 * | 6/2011 | Mukai et al. | ............ | 318/400.21 |
| 2011/0163708 | A1 * | 7/2011 | Mukai et al. | ................. | 318/722 |

(Continued)

FOREIGN PATENT DOCUMENTS

JP    2003-182598    7/2003

OTHER PUBLICATIONS

Office Action (6 pages) dated Sep. 28, 2014, issued in corresponding Chinese Application No. 201210316907.X and English translation (8 pages).

*Primary Examiner* — Michael McCullough
*Assistant Examiner* — Michael E Butler
(74) *Attorney, Agent, or Firm* — Nixon & Vanderhye PC

(57) ABSTRACT

A microcomputer o n EPS performs failure diagnosis of a motor or a motor driving circuit after an ignition switch is turned on and before an ECU starts control of power supply to the motor. When an angular velocity of the motor rotatable with a steering wheel is greater than a predetermined value, the failure diagnosis is not made. Thus, a period from the turn-on of the ignition switch to the start of current supply control is shortened.

7 Claims, 4 Drawing Sheets

(56) References Cited

U.S. PATENT DOCUMENTS

| | | |
|---|---|---|
| 2011/0204839 A1* | 8/2011 | Mukai et al. ................. 318/724 |
| 2012/0006612 A1* | 1/2012 | Wilson-Jones et al. ...... 180/446 |
| 2012/0035801 A1* | 2/2012 | Browne et al. .............. 701/29.1 |
| 2012/0130674 A1* | 5/2012 | Fisher et al. ................. 702/151 |
| 2012/0161681 A1* | 6/2012 | Kuroda .................... 318/400.21 |
| 2012/0203430 A1* | 8/2012 | Shimada et al. ................ 701/41 |
| 2012/0253588 A1* | 10/2012 | Ghoneim .................... 701/32.9 |

* cited by examiner

ELECTRIC POWER STEERING SYSTEM

CROSS REFERENCE TO RELATED APPLICATION

This application is based on and incorporates herein by reference Japanese patent application No. 2011-210818 filed on Sep. 27, 2011.

TECHNICAL FIELD

The present disclosure relates to an electric power steering system.

BACKGROUND ART

An electrical power steering system (EPS) assists a vehicle driver's steering operation by driving force of a motor. The EPS disclosed in, for example, JP2003-182598A, performs failure diagnosis to diagnose presence or absence of a motor and a motor driving circuit during a period from turn-on of an ignition switch to a start of assisting steering operation.

In JP2003-182598A, a motor relay provided between the motor driving circuit and the motor during the failure diagnosis is performed. As a result, when a driver operates a steering wheel, the motor operatively coupled to the steering wheel through a gear responsively generates an induction voltage, which will likely lower accuracy of failure diagnosis. It is therefore proposed, in the failure diagnosis after turn-on of a motor relay, to monitor an angular velocity of the motor so that the failure diagnosis is postponed and performed when the angular velocity is lowered to a predetermine value. If the failure diagnosis is postponed and performed only after the induction voltage becomes less than a predetermined value, a period from the turn-on of an ignition switch to a start of assist operation of the EPS becomes long.

SUMMARY

It is therefore an object of the present disclosure to provide an electric power steering system, which shortens a period required before starting an assist operation.

According to one aspect, an electric power steering system comprises a motor, a motor driving circuit, a control circuit and an ignition switch.

The motor is linked to a steering wheel of a vehicle for isting a steering operation of the steering wheel. The motor driving circuit includes switching devices and supplies the motor with a driving current for driving the motor by converting a current supplied from a power source by turning on and off of the switching devices. The control circuit controls the current supply to the motor by controlling the switching devices of the motor driving circuit. The ignition switch is provided in a power supply path of the control circuit.

The control circuit includes a failure diagnosis section and a motor condition detection section. The failure diagnosis section performs failure diagnosis about the motor or the motor driving circuit in a period from a turn-on of the ignition switch to a start of motor current supply control for the motor. The motor condition detection section detects a motor parameter variable with an angular velocity of the motor.

The failure diagnosis section prohibits the failure diagnosis when the motor parameter indicates that the angular velocity of the motor exceeds a predetermined velocity threshold value.

BRIEF DESCRIPTION OF THE DRAWINGS

The above and other objects, features and advantages will become more apparent from the following detailed description made with reference to the drawings In the accompanying drawings.

DETAILED DESCRIPTION OF THE EMBODIMENT (First Embodiment)

Figure 1:
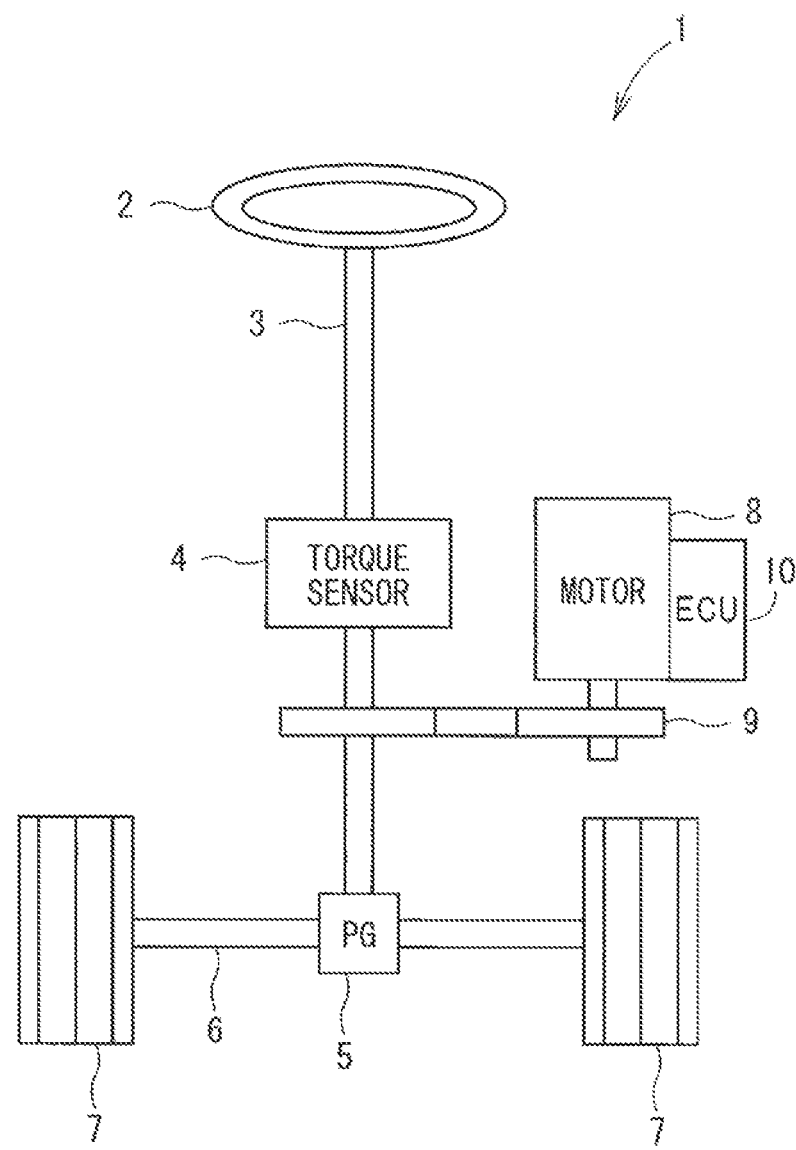
FIG. 1 is a schematic view of an EPS according to a first embodiment.
Figure 2:
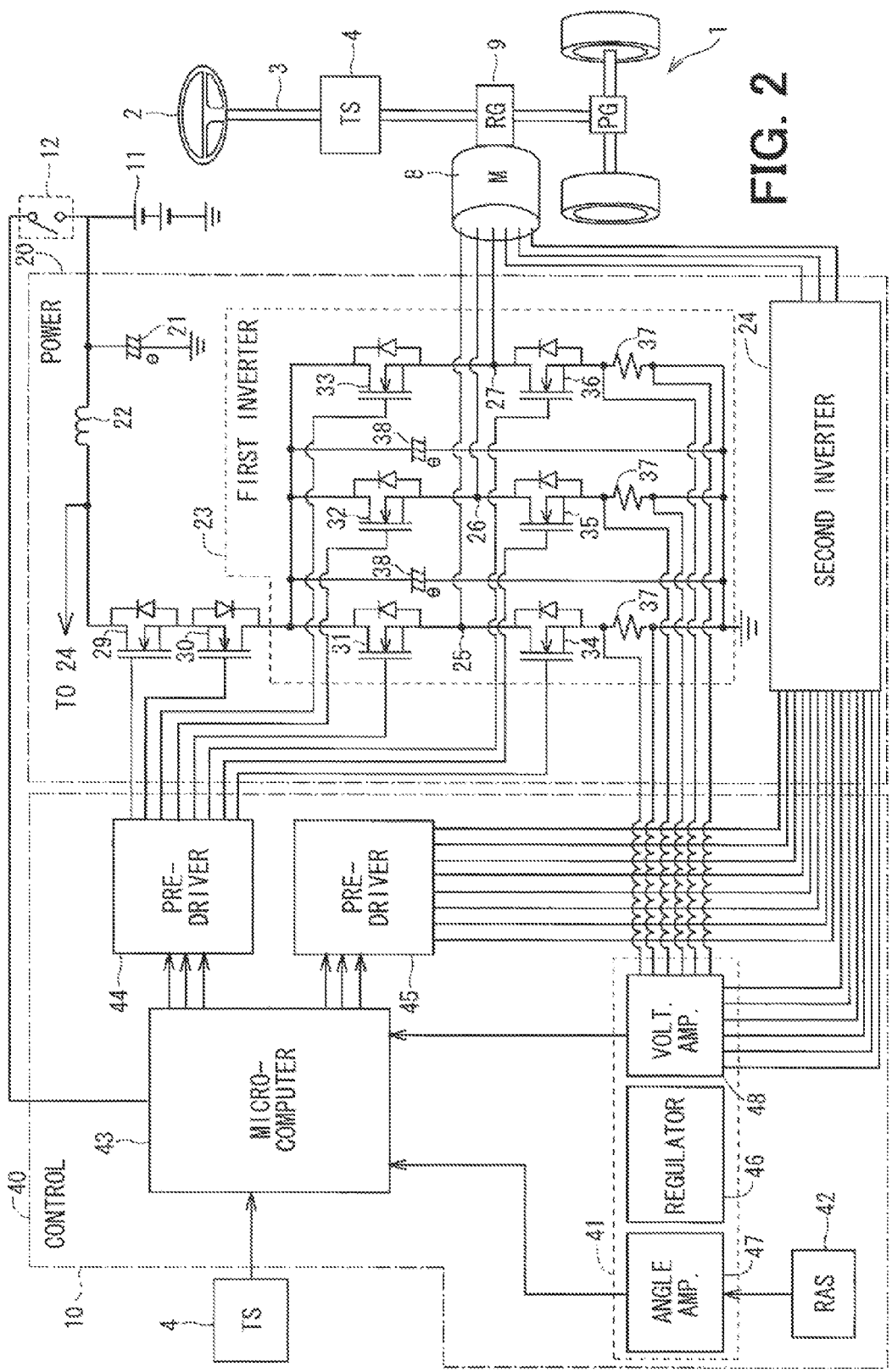
FIG. 2 is a circuit diagram of the EPS according to the first embodiment.
Figure 3:
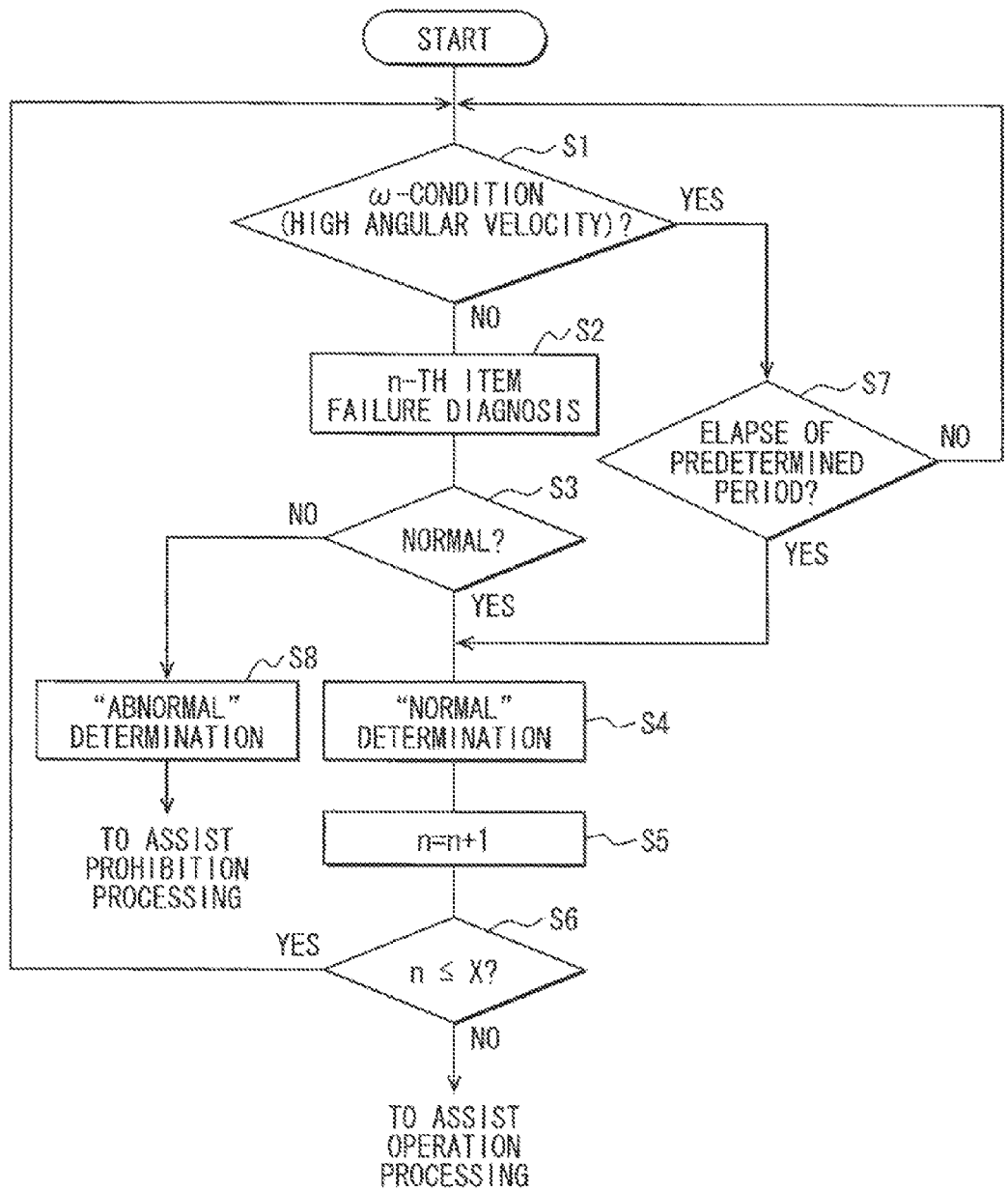
FIG. 3 is a flowchart of failure diagnosis of the EPS according to the first embodiment.

Referring to FIG. 1 to FIG. 3 an electric power steering system (EPS) according to a first embodiment is designated by reference numeral 1. A torque sensor 4 is attached to a steering shaft 3, which is coupled to a steering wheel 2, to detect a steering torque. A pinion gear 5 is provided at a top end of the steering shaft 3 and meshed with a rack shaft 6. A pair of tire wheels 7 is coupled rotatbly to both ends of the rack shaft 6 through a tie rod and the like. Rotary motion of the steering shaft 3 is converted to linear motion of the rack she 6 by the pinion gear 5. The tire wheels 7 are thus steered by an angle corresponding to a displacement of the linear motion of the rack shaft 6. The EPS 1 includes a motor 8, a reduction gear9 and an electronic control unit (ECU) 10, which controls driving of the motor 8 by controlling motor current supply to the motor 8. The motor 8 is a three-phase brushless motor, which generates assist torque for assisting a steering operation of the steering wheel 2. This torque is transferred to the steering shaft 3 via the reduction gear 9.

A circuit configuration of the ECU 10 is shown in FIG. 2. The ECU 10 includes a power circuit 20 and a control circuit 40. The ECU 10 controls driving of the motor 8, The power circuit 20 of the ECU 10 includes a first capacitor 21, a choke coil 22, plural power modules and the like.

The power circuit 20 is supplied with electric power from a power source 11 provided outside the ECU 10. The first capacitor 21 and the choke coil 22 provided in the power circuit 20 form a filter circuit, which reduces noises sent to the ECU 10 from other electric systems sharing the power source 11. The choke coil 22 is connected in series between the power source 11 and power relays 29, 30 to attenuate voltage fluctuation.

The power circuit 20 includes two power modules, which are a first inverter circuit 23 and a second inverter circuit 24. One power module is formed by molding the power relays 29, 30, switching devices 31 to 36 forming a first inverter circuit 23, shunt resistors 37 and the like by a sealing material such as resin. The power relays 29, 30 are MOSFETS, which are field-effect transistors. The power relays 29 and 30 are provided between the switching devices 31 to 36 and the choke coil 22 to shut off a current, which flows to the motor 8 through the switching devices 31 to 36, when an abnormality arises.

The switching devices 31 to 36 are also MOSFETs similarly to the power relays 29 and 30. The switching devices 31 to 36 are controlled to turn on and off source-drain paths by gate voltages. Three switching devices 31 to 33 on a power so rce side (high potential side) such that respective drains are connected to the power source side and respective sources are connected to drains of corresponding three switching devices 34 to 36, which are provided at a ground side (low potential side). The three switching devices 34 to 36 at the ground side are grounded through shunt resistors 37. Junctions 25 to 27 between the switching devices 31 and the corresponding switching devices 34 to 36 are connected to three phase coils of the motor 8, respectively.

The shunt resistors 37 are connected between the switching devices 34 to 36 and the ground. A driving current flowing to the motor 8 as the motor current is detected by detecting voltages or currents applied to shunt resistors 37. Second capacitors 38 are connected between a wire of the power source side of the switching devices 31 to 33 and a wire of the ground side. Thus, the second capacitors 38 are connected in parallel to the switching devices 31 to 36. The second capacitors 38 store electric charges to supplement power supply to the switching devices 31 to 36 and absorb ripple currents generated by switching-over of currents.

The second inverter circuit 24 included in the other power module is supplied with power from a wire branching from the choke coil 22. The other power module has the same configuration as one power module described above, and will not be described in detail.

The control circuit 40 is formed of a custom-made IC 41, a rotation angle sensor 42, a microcomputer 43 and pre-drivers 44, 45 and he like. The custom-made IC 41 is a semiconductor integrated circuit including a regulator 46, a rotation angle sensor signal amplifier circuit 47, a detection voltage amplifier circuit 48 and the like. The regulator 46 is a stabilization circuit for stabilizing the power supplied from the power source 11. The regulator 46 stabilizes the power supplied to each part of the control circuit 40. When an ignition switch 12 provided in the power circuit of the control circuit 40 is turned on, the power is supplied to the microcomputer 43 and the like from the power source through the regulator 46. Thus the microcomputer 43 operates with a stabilized predetermined voltage (for example, 5V).

A signal of the rotation angle sensor 42 is inputted to the amplifier circuit 47, The rotation angle sensor 42 is provided within a magnetic filed of a magnet provided on a shaft of tl e motor 8 to detect changes of urrounding magnetic field and sends a detection value as a signal related to a rotation angle of the motor 8 to the rotation angle sensor signal amplifier circuit 47. The amplifier circuit 47 amplifies the signal sent from the rotation angle sensor 42 and related to the rotation angle of the motor 8, and outputs the amplified signal to the microcomputer 43. The microcomputer 43 is capable of detecting an angular velocity of the motor based on the signal sent from the rotation angle sensor 42 as a motor parameter of the motor, which varies with the angular velocity. The microcomputer 45 and the rotation signal sensor 42 corresponds to a motor condition detection section. The amplifier circuit 48 detects terminal voltages of the shunt resistors 37, amplifies the detection values and outputs the amplified detection values to the microcomputer 43.

The microcomputer 43 is a small-sized computer, which includes a CPU as a processing section, a ROM and a RAM as a storing section and the like. The microcomputer 43 executes various processing by the CPU according to various programs stored in the ROM. The microcomputer functions as a control apparatus, a time measuring section or a failure diagnosis section.

The microcomputer 43 is inputted with the signal related to the rotation ngle of the motor 8 from the amplifier circuit 47, the terminal voltages of the shunt resistors 37, a steering torque signal of the torque sensor 4, vehicle speed information of a CAN system and the like. The microcomputer 43, receiving these signals, controls the inverter circuits 23 and 24 through the pre-drivers 44 and 45 based on the rotation angle of the motor 8. The microcomputer 43 further controls the inverter circuits 23 and 24 based on the terminal voltages of the shunt resistors 37 inputted from the detection voltage amplifier circuit 48 so that the current supplied to the motor 8 varies in a sinusoidal wave form.

The ECU 10 includes two system of motor driving circuits. The microcomputer 43 controls the first inverter circuit 23 and the second inverter circuit 24 by one pre-driver 44 and the other pre-driver 45, respectively, and similarly to each other. The inverter circuits 23 and 24 form a main part of a motor driving circuit.

The microcomputer 43 output pulse signals, which are generated by pulse width modulation (PWM) control, through the pre-drivers 44 and 45 to assist variably the steering operation of the steering wheel 2 in accordance with the vehicle speed. The pulse signals are generated based on outputs of the rotation angle sensor 43, the torque sensor 4, the shunt resistors 37, vehicle information from the CAN system. The pulse signals controls switching on and off of the switching devices in the two systems of inverter circuits 23 and 24. The motor 8 is thus supplied with driving currents of different phases as the motor current in the sinusoidal waveform and generates a rotating magnetic field in the stator coil. The motor 8 generates rotating force by the ating magnetic field thereby to power-assist the steering operation of a vehicle driver.

The EPS 1, particularly the ECU 10 (microcomputer 43), performs a failure diagnosis operation as shown in FIG. 3. The processing of failure diagnosis is performed as an initial check before starting motor current supply control after the turn-on of the ignition switch 12, that is, after a start of power supply to the EPS 1.

At step S1 (step is referred to only as S hereinbelow), it is checked whether a predetermined ω-condition as one example of a predetermined motor condition is satisfied. The ω-condition is satisfied when the angular velocity (ω rad/s) of rotation of the motor 8 exceeds or is greater than a predetermined velocity threshold value. The angular velocity of the motor 8 has a correlation to the induction voltage generated by the motor 8. Therefore, it is possible to detect the induction voltage by detecting the angular velocity of the motor 8.

The motor parameter of the motor condition variable with the angular velocity of the motor 8 is also detectable from the signal sent from the rotation angle sensor 42. The motor parameter of the motor condition variable with the angular velocity of the motor 8 is further detectable by various devices other than the rotation angle sensor 42. For example, it is possible to detect the angular velocity of the motor 8 by a steering sensor (not shown), which detects a steering operation of the steering wheel 2. This is because the steering wheel 2 and the motor 8 are linked via the reduction gear 9. It is further possible to detect the angular velocity of the motor 8 by operating the torque sensor 4 as an angle sensor.

When the ω-condition is not satisfied, that is, the angular velocity or the motor 8 is lower than the predetermined velocity threshold value (S1:NO), a failure diagnosis is performed about a first failure diagnosis item (S2), assuming that "n" (number of items to be subjected to failure diagnosis) is 1 for the first time immediately after the turn-on of the ignition switch 12. When the ω-condition is not satisfied and the induction voltage generated by the motor 8 is less than a fixed voltage (predetermined voltage threshold value), the induction voltage is small and its influence to failure detection about various failure diagnosis items is negligible.

Failure diagnosis items may be short-failure or open-failure of the switching devises 31 to 36 of the motor circuit (inverter circuit), for example. Failure of the switching devices 31 to 36 can be diagnosed by monitoring voltages of the junctions 25 to 27 between the switching devices 31 to 33 of the power source side and the switching devices 34 to 36 of the ground side while controlling the gate voltage of each switching devices 31 to 36.

Since the junctions 25 to 27 are connected to the three phase coils of the motor 8, it becomes difficult to detect failure of the switching devices 31 to 36 when the induction voltage generated by the motor 8 exceeds the fixed voltage. For this reason, the failure diagnosis out this item is performed when the ω-condition is not satisfied.

Other failure diagnosis items, which will be influenced by the induction voltage of the motor 8, include the operation of the shunt resistor 37 or grounding of a motor current supply cable or path. In the failure diagnosis about the shunt resistor 37, a potential difference between both ends of the shunt resistor 37 is detected. In the failure diagnosis about the grounding of the motor current supply cable, the voltages at the junctions 25 to 27 are detected. These failure diagnosis items are affected by the induction voltage from the motor 8 in performing the failure diagnosis.

If no failure is detected in the failure diagnosis about the first item (S3:YES), it is determined that the first item (n=1) subjected to the failure diagnosis is normal, Then the failure diagnosis is performed about the next item by incrementing the number of the diagnosis items (n=n+1 at S5) and determining that there still remains one or more failure diagnosis items (n≤X at S6). "X" is a total number of failure diagnosis items, When it is determined at S1 that the ω-condition is satisfied, that is, the angular velocity is high (S1:YES), the microcomputer 43 measures a period (time interval) in which the ω-condition is continuously satisfied (S7). When the angular velocity of the motor 8 becomes lower than the predetermined velocity threshold value before an elapse of a predetermined period, that is, the ω-condition is not satisfied (S7:NO, S1:NO), the failure diagnosis is performed (S2), When the angular velocity of the motor 8 becomes higher than the predetermined velocity threshold value for more than the predetermined period (S7:YES) under the condition that the ω-condition is satisfied (S1:YES), it is determined that the first item subjected to the failure diagnosis is "normal" (S4). Then, the failure diagnosis is performed about a next item by incrementing the number "n" to "n+1" (S5).

When the failure diagnosis is completed about all X items (S6:NO), the ECU 10 starts to control power supply to the motor 8 by the inverter circuit 23, 24 so that the EPS 1 starts assisting the operation of the steering wheel 2. When a failure is detected in any one of the plurality of failure diagnosis items (S3:NO), it is determined that such an item subjected to the failure diagnosis is determined "abnormal" (S8). Then, assist prohibition processing or the like is performed.

According to tt first embodiment, when the motor condition satisfies the predetermined condition, which indicates, for example, the angular velocity of the motor 8 is higher than the predetermined velocity threshold value (S1:YES), the failure diagnosis of each diagnosis item is not performed (S7:YES). As a result, a period required to perform the failure diagnosis about each item is prevented from becoming longer than the predetermined period. Thus the period from the turn-on of the ignition switch 12 to the start of assist operation for the steering wheel 2 is shortened. Thus the assist operation of the EPS 1 can be started at earlier time. According to the first embodiment, the influence of the induction voltage is reduced and hence reliability of failure diagnosis is enhanced.

(Second Embodiment)

Figure 4:
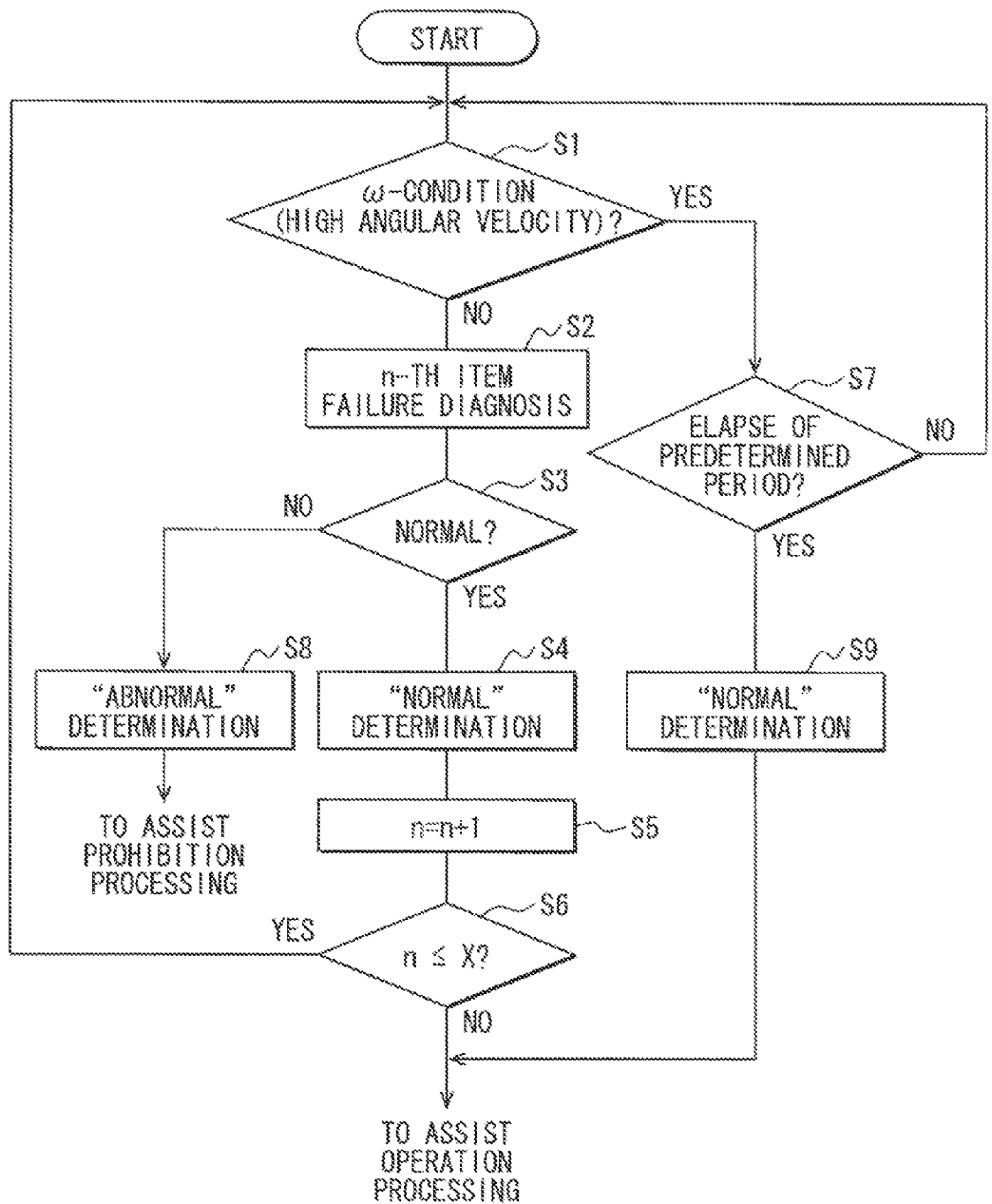
FIG. 4 is a flowchart of failur diagnosis of the EPS according second embodiment.

According to a second embodiment, the EPS 1 erform the failure diagnosis as shown in FIG. 4, in which substantially the same parts are designated by the same reference numerals to preclude the same description.

In the second embodiment, when the angular velocity of the motor 8 continues to exceed the predetermined velocity threshold value, that is, the ω-condition is continuously satisfied for the predetermined period (S7:YES), all the diagnosis items checked subsequently are determined to be "normal" (S9). It is possible to determine that all of diagnosis items, which are influenced by the induction voltage, are normal and to perform the failure diagnosis only about failure diagnosis items, which are not influenced by the induction voltage. When the failure diagnosis processing is thus completed, the ECU 10 controls current supply to the motor 8 and the EPS 1 starts the assist operation for the steering wheel 2.

According to the second embodiment, when the ω-condition is continuously satisfied for more than the predetermine period, the subsequent failure diagnosis items are all determined to be normal (S9). As a result, the period required to perform the failure diagnosis processing is prevented from becoming longer than the predetermined period. It is thus possible to shorten the period required from the turn-on of the ignition switch 12 to the start of assist operation for the steering wheel 2. It is further prevented that the EPS erroneously diagnoses failure diagnosis items, which are influenced by the induction voltage.

(Other Embodiments)

According to the above-described embodiments, description was ade about the EPS, in which the motor and the inverter circuit are directly connected. It is possible to implement the above-described embodiments to an EPS, in which a motor relay is provided in a power supply cable or path connecting a motor and an inverter circuit. In this example, when the motor relay is turned on in the course of failure diagnosis, each failure diagnosis item plural failure diagnosis items influenced by induction voltage or all diagnosis items diagnosed after satisfaction of the ω-condition may be precluded by satisfaction of the ω-condition. Thus it is also possible to shorten the period required before starting the assist operation.

The above and other embodiments may be modified by combining the disdosed embodiments or in various other embodiments.

What is claimed is:
1. An electric power steering system comprising:
   a motor linked to a steering wheel of a vehicle for assisting a steering operation of the steering wheel;
   a motor driving circuit including switching devices and supplying the motor with a driving current for driving the motor by converting a current supplied from a power source by turning on and off of the switching devices;

a control circuit for controlling the current supply to the motor by controlling the switching devices of the motor driving circuit;

an ignition switch provided in a power supply path of the control circuit, wherein the control circuit is configured to:

detect a motor parameter variable with an angular velocity of the motor;

determine if the angular velocity of the motor exceeds a predetermined velocity threshold value;

when the angular velocity of the motor is determined not to exceed the predetermined velocity threshold value, perform a failure diagnosis about the motor or the motor driving circuit in a period from a turn-on of the ignition switch to a start of motor current supply control for the motor;

when the angular velocity of the motor is determined to exceed the predetermined velocity threshold value, measure a period during which the angular velocity of the motor continues to determine if the measured period exceeds a predetermined time threshold value;

when the angular velocity of the motor is determined to exceed the predetermined velocity threshold value and the measured period is determined to be more than the predetermined time threshold value, determine that the motor or the motor driving circuit is normal, and said failure diagnosis is a failure diagnosis of an operation state of the motor driving circuit or the motor, which is different from the period of continuation of the angular velocity of the motor exceeding the predetermined velocity threshold value.

2. The electric power steering system according to claim 1, wherein:

the control circuit has plural failure diagnosis items to perform about the motor or the motor driving circuit; and the control circuit is further configured to determine that a predetermined failure diagnosis item among the plural diagnosis items, which are influenced by an induction voltage generated by the motor, is normal about the predetermined failure diagnosis item when the measure period exceeds the predetermined period before starting the failure diagnosis about the predetermined failure diagnosis item, and perform the failure diagnosis about a next failure diagnosis item among the plural failure diagnosis items.

3. The electric power steering system according to claim 1, wherein:

the control circuit has plural failure diagnosis items to perform about the motor or the motor driving circuit; and the control circuit is further configured to determine that all failure diagnosis items among the plural failure diagnosis items which are influenced by an induction voltage generated by the motor are normal when the measured period exceeds the predetermined period before starting the failure diagnosis about a predetermined failure diagnosis item among the plural failure diagnosis items.

4. The electric power steering system according to claim 1, wherein:

said failure diagnosis is a failure diagnosis of a short-failure of the switching devices of the motor driving circuit.

5. The electric power steering system according to claim 1, wherein:

said failure diagnosis is a failure diagnosis of an open-failure of the switching devices of the motor driving circuit.

6. The electric power steering system according to claim 1, wherein:

said failure diagnosis is a failure diagnosis of a grounding of a motor current supply cable.

7. The electric power steering system according to claim 1, wherein the control circuit is configured to:

when the angular velocity of the motor is determined to exceed the predetermined velocity threshold value and the measured period is determined to be less than or equal to the predetermined time threshold value, again determine if the angular velocity of the motor exceeds the predetermined velocity threshold value.

* * * * *